United States Patent [19]

Yamamoto et al.

[11] 4,094,204
[45] June 13, 1978

[54] DRIVING APPARATUS AND METHOD

[75] Inventors: Akinori Yamamoto, Kariya; Masumi Kato, Toyoake, both of Japan

[73] Assignee: Nippondenso Co., Ltd., Kariya, Japan

[21] Appl. No.: 710,151

[22] Filed: Jul. 30, 1976

[30] Foreign Application Priority Data

Aug. 9, 1975 Japan .................... 50-96822

[51] Int. Cl.² .............. F16H 55/52; F16H 5/46; F16D 43/02
[52] U.S. Cl. ............... 74/230.17 E; 74/230.17 A; 74/230.17 B; 74/230.17 M
[58] Field of Search ........... 74/230.17 E, 230.17 A, 74/230.17 M, 230.17 B

[56] References Cited

U.S. PATENT DOCUMENTS

| 3,006,221 | 10/1961 | Cromwell | 74/230.17 M |
| 3,054,298 | 9/1962 | Graybill | 74/230.17 M |
| 3,082,636 | 3/1963 | Steinlein | 74/230.17 M |
| 3,395,587 | 8/1968 | Casini | 74/230.17 M |
| 3,604,280 | 9/1971 | Davis | 74/230.17 E |
| 3,800,608 | 4/1974 | Bessette | 74/230.17 E |
| 3,893,343 | 7/1975 | Zaiser et al. | 74/230.17 A |
| 3,906,808 | 9/1975 | Zaiser et al. | 74/230.17 E |
| 3,995,505 | 12/1976 | Luenberger | 74/230.17 E |
| 4,020,711 | 5/1977 | Woollard | 74/230.17 A |

FOREIGN PATENT DOCUMENTS

| 2,441,086 | 3/1976 | Germany | 74/230.17 E |
| 2,535,513 | 2/1976 | Germany | 74/230.17 E |

Primary Examiner—Samuel Scott
Assistant Examiner—W. R. Henderson
Attorney, Agent, or Firm—Cushman, Darby & Cushman

[57] ABSTRACT

A driving apparatus which includes a driving and driven belt pulleys at least one of which is constructed to change the effective diameter thereof, in response to the rotational speed of a driving power source. An endless v-belt serves as the driving connection between the driving and driven pulleys. The belt pulley with a changeable effective diameter has a first fixed pulley plate, a second slidable pulley plate and at least one weight operated by the centrifugal force acting thereon. The weight serves to shift the second pulley plate relative to the first pulley plate thereby to change the effective diameter of an annular groove defined between the first and second pulley plates with the increase of the centrifugal force. Therefore, the speed ratio of a driven unit to the driving power source is varied in response to the speed of the driving power source.

4 Claims, 7 Drawing Figures

DRIVING APPARATUS AND METHOD

BACKGROUND OF THE INVENTION

The present invention relates to a driving apparatus for driving or actuating a driven unit in association with a driving power source, and more particularly to a driving apparatus with an automatic speed ratio change device which automatically changes the speed ratio of a driven shaft to a driving shaft in response to the rotational speed thereof. The present invention also relates to a driving method in which a driven unit is rotated in association with a driving power source at a changeable rotational speed ratio changing in response to the rotational speed of the driving power source.

An automotive vehicle is provided with various auxiliary machineries such as an alternator, a cooling fan and a water pump, etc., all of which are driven by an internal combustion engine. Conventionally, these auxiliary machineries have been driven through belts at a rotational speed in proportion to that of a driving shaft of the engine.

However, it has been required recently from the view-point of the durability of the auxiliary machinery as well as the power expenditure of the engine to lower the speed ratio of the auxiliary machinery to the engine as the engine speed increases and to maintain the speed of the auxiliary machinery substantially at a constant value. For example, the alternator should be driven within a speed range below a predetermined value so as to insure the durability thereof, since the alternator output characteristic in which the output current becomes substantially constant when the rotational speed of a rotor exceeds the predetermined value. The cooling fan may also be driven at about a constant speed in a common speed range of the engine.

There is known in the art a driving apparatus with a speed change device which includes at least two pairs of pulleys having different diameter-ratios and belts interconnecting the pulleys. In this apparatus, one pair of pulleys is connected to a driven shaft and a driving shaft while the other pair of pulleys is released from the shafts in the low speed range; the second pair of pulleys is connected to the shafts in the high speed range.

By this apparatus, however, the speed ratio of the driven shaft to the driving shaft is abruptly changed. The belts and the auxiliary machinery are shocked by this abrupt change in the speed ratio and may possibly be broken. Further, it is impossible for this apparatus to maintain the rotational speed of the auxiliary machinery at a substantially constant value.

SUMMARY OF THE INVENTION

It is, therefore, an object of the present invention to provide a driving apparatus with an automatic speed ratio change device which gradually or smoothly changes the speed ratio of a driven shaft to a driving shaft in accordance with the speed thereof.

It is another object of the present invention to provide a driving apparatus with an automatic speed ratio change device which gradually or smoothly lowers the speed ratio of a driven shaft to a driving shaft as the rotational speed of a driving power source increases.

It is another object of the present invention to provide a driving apparatus with a speed ratio change device which lowers the speed ratio as the speed of a driving power source increases, thereby maintaining a driven shaft substantially at a constant rotational speed when the speed of the driving power source exceeds a predetermined value.

It is still another object of the invention to provide a driving method which is optimum for an auxiliary machinery of an automotive vehicle.

These and other objects, advantages and features of the present invention will become more apparent from the following detailed description of the preferred embodiments.

DESCRIPTION OF THE PREFERRED EMBODIMENTS

Figure 1:
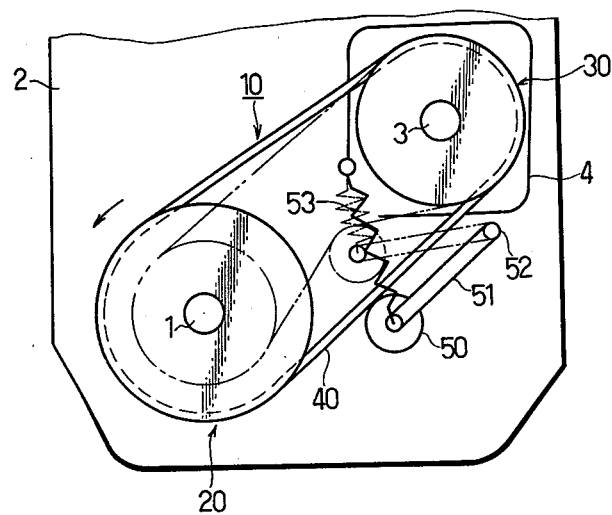
FIG. 1 is a diagramatic view of the driving apparatus of the first embodiment according to the present invention.

Referring to FIGS. 1 to 4, a driving apparatus of the present invention is illustrated as used for driving an auxiliary machinery or an alternator by an internal combustion engine of an automotive vehicle.

The driving apparatus generally designated by a reference numeral 10 includes a driving belt pulley 20 with a changeable diameter, a driven belt pulley 30 with a fixed diameter, a V belt 40 and a tension pulley 50. The driving belt pulley 20 is secured to a driving shaft 1 of the engine 2 to be rotated by the same, while the driven belt pulley 30 is secured to a driven shaft or a rotor shaft 3 of the alternator 4 to rotate the rotor shaft 3. The V belt 40 is disposed around both of the pulleys 20 and 30 to link them together in order to rotate the driven pulley 30 with the driving pulley 20. The tension pulley 50 is carried by a lever 51 which is pivoted by a pin 52 fixed to the engine block, being biased by a spring 53 to contact with and push the V belt 40 so as to give a suitable tension to the V belt 40.

The driving pulley 20 includes a pulley disk 200 fixed to the driving shaft 1 of the engine, to the periphery of which a generally cylindrical member or a first pulley plate 210 is secured at its one end. The first pulley plate 210 has a first slope portion 211 formed on the other end thereof. A slidable helical gear 220 is carried by the driving shaft 1, having an inner straight spline 221 engaging with an outer straight spline 5 formed on the driving shaft 1. The helical gear 220 is slidable relative to the driving shaft 1, but is rotated integrally with the shaft by means of the straight splines. To one end portion of the helical gear 220 is fixed a generally dish-shaped member or a second pulley plate 230 which has on its periphery a second slope portion 231 facing to the first slope portion 211 of the first pulley plate 210. The slope portions 211 and 231 of the first and the second pulleys define therebetween an annular groove 240 of the V shape in cross-section on which the V belt 40 is disposed. The second pulley plate 230 is movable with the helical gear 220 relative to the shaft 1 and hence to the first pulley plate 210. With the movement of the second pulley plate 230 the slope portion 231 is moved toward or apart from the first slope portion 211 of the first pulley plate 210 thereby changing the width of the V shaped annular groove 240. The effective diameter of the groove, that is the diameter of a contacting portion of the groove which contacts with the V belt 40, is then changed in response to the change of the width of the groove 240.

The driving pulley 20 also includes four weights or blocks 250 arranged around the helical gear 220, each of which is rotatably pivoted at the foot portion 251 thereof by a screw 252, screwed on the pulley disk 200, through a bushing 253. The foot portion 251 of each block 250 has a helical gear portion 254 formed on the periphery thereof, which engages with helical gear 220. The blocks 250 are rotated with the pulley disk 200, being revolved about the screw 252 by centrifugal force, thereby shifting the helical gear 220 to the left in FIG. 2.

An end plate 260 is secured to the end of the driving shaft 1 by means of a bolt 261. Two coil springs or return springs 262 and 263 having different diameters from each other are interposed between the second pulley plate 230 and the end plate 260 to bias the second pulley plate 230 to the right. A cylindrical stopper plate 264 is fixed to the inner surface of the end plate 260 at its one end, the other end thereof facing on the second pulley plate 230. The end plate 260 has a cylindrical portion 265 extending inwardly at the periphery thereof, which is in contact with a cylindrical portion 232 formed on the second pulley plate 230 so as to serve to guide the axial movement of the second pulley plate 230. The height of the cylindrical portion 265 is equal to that of the stopper plate 264.

The driven pulley 30 is of the conventional type having a fixed diameter.

When the engine 2 is started the driving belt pulley 20 is rotated with the driving shaft 1 and transmits the driving power to the driven belt pulley 30 through the V belt 40 to rotate the driven pulley 30 and hence the rotor shaft 3 of the alternator 4. The alternator 4 generates electric current in a conventional manner in response to the rotational speed of the rotor shaft 3. The tension pulley 50 pushes the middle portion of the V belt 40 so as to prevent the V belt 40 from slipping on the pulleys.

Figure 2:
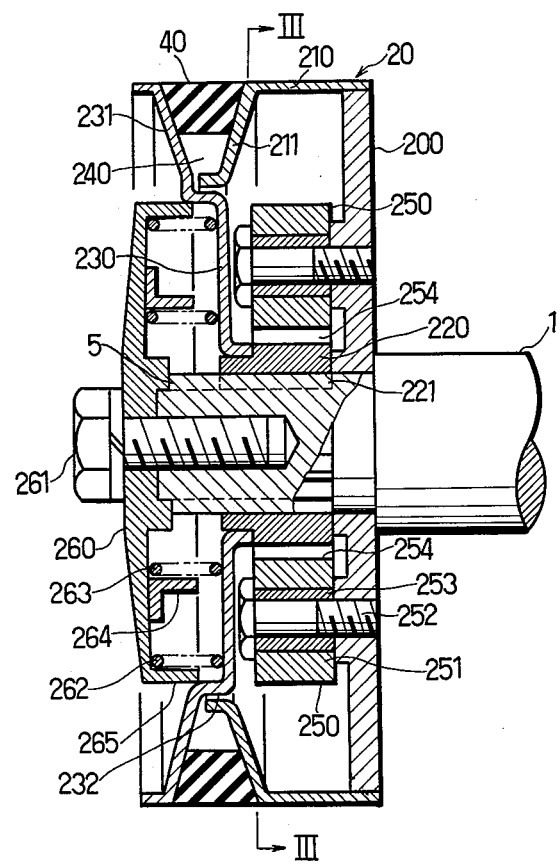
FIG. 2 is a sectional view of the driving belt pulley shown in FIG. 1.
Figure 3:
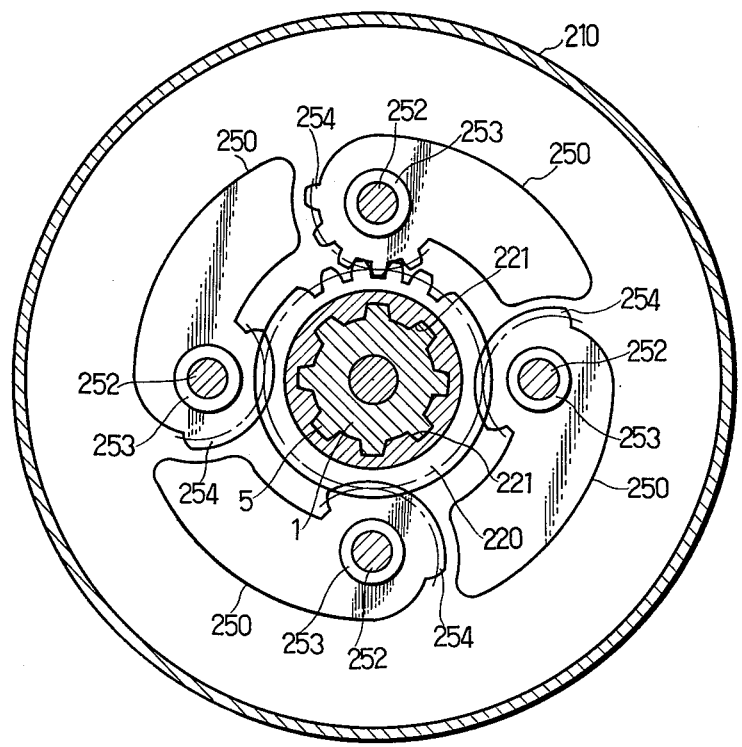
FIG. 3 is a sectional view taken on line III—III of FIG. 2.
Figure 4:
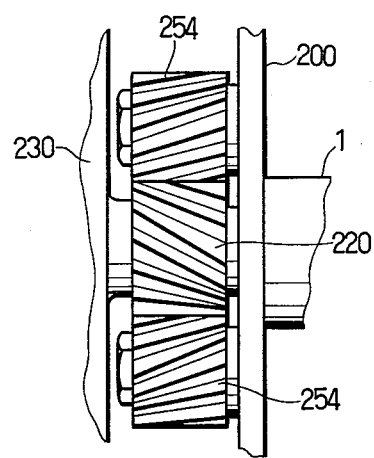
FIG. 4 is an elevational view of the helical gears shown in FIGS. 2 and 3.

In the low speed operation of the engine 2, the second pulley plate 230 and the helical gear 220 of the driving belt pulley 20 is in the position where the one end of the helical gear 220 contacts with the inner surface of the pulley disk 200 as shown in FIG. 2, since the centrifugal force acting on the weights 250 is not so large as to shift the second pulley 230 and the helical gear 220 to the left against the return springs 262 and 263. The width of the V shaped annular groove 240 defined between the first and second slope portions 211 and 231 is maintained at the minimum, with the result that the effective diameter of the driving pulley 20 about which the V belt 40 is disposed is maintained at the maximum. In this condition, the speed ratio of the driven pulley 30 to the driving pulley 20 is kept at a larger value ($R_1$ in FIG. 6).

Figure 5:
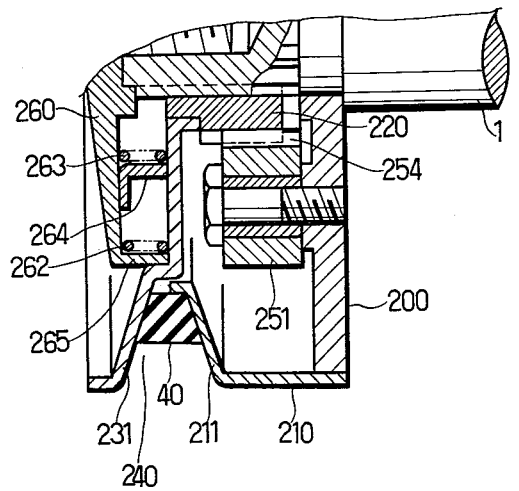
FIG. 5 is a fragmentary view, similar to FIG. 2, showing the driving belt pulley in the opposite position from FIG. 2.

When the engine speed exceeds a predetermined value ($N_1$ in FIG. 6), the centrifugal force acting on the weights 250 of the driving pulley 20 increases to overcome the force of the return springs 262 and 263. Therefore, the weights 250 are revolved around the screws 252 to shift to the left in FIG. 2 the helical gear 220 which is engaged with the helical gear portion 254 of the weights 250. The second pulley plate 230 is shifted to the left with the helical gear 220 against the return spring to widen the width of the V shaped annular groove 240. Consequently, the effective diameter of the pulley 20 is decreased gradually depending upon the increase of the engine speed. In response to this decrease of the effective diameter, the speed ratio of the driven pulley 30 to the driving pulley 20 is lowered gradually or steplessly, thereby keeping the driven pulley 30 and hence the alternator 4 substantially at a constant rotational speed in spite of the increase of the engine speed. This operation is continued until the second pulley plate 230 is brought to contact with the stopper plate 260, or the inner surface of the V belt 40 is brought to contact with the bottom surface of the groove 240, as shown in FIG. 5 and at two-dot chain line in FIG. 1.

Figure 6:
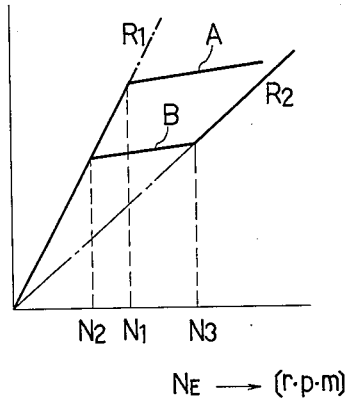
FIG. 6 is a graph showing the speed characteristic of the auxiliary machinery driven through the apparatus of the invention.

FIG. 6 shows the characteristic of the alternator speed $N_A$ relative to the engine speed $N_E$, in which a solid line A shows the characteristic according to the above mentioned driving apparatus. It is noted from this characteristic that the alternator is driven substantially at a constant speed when the engine speed exceeds a predetermined value $N_1$, so that the durability of the alternator is secured without decreasing the output current of the alternator.

By changing the setting force of the return springs 262 and 263 and the angle of torsion of the helical gear 220 and helical gear portion 254, the characteristic shown by a solid line B in FIG. 6 is obtained from the above driving apparatus. With this characteristic, the auxiliary machinery is driven at a larger speed ratio $R_1$ until the engine speed reaches $N_2$, at a changing speed ratio within the engine speed range between $N_2$ and $N_3$, and at a smaller speed ratio $R_2$ after the engine speed exceeds $N_3$. The speed of the auxiliary machinery is kept at about a constant speed within the range $N_2$–$N_3$. Since the engine cooling fan and the water pump should be driven with increased speed so as to prevent the over heating of the engine in the engine high speed range, the characteristic B is optimum for either the cooling fan or the water pump. In this case, the durability of the auxiliary machinery is also insured in the range between the engine speed $N_2$ and $N_3$.

As apparent from the characteristics in FIG. 6, the speed ratio is changed steplessly or smoothly according to the apparatus of this invention. There is no shock applied to the pulleys and belt, thereby preventing the pulleys and the belt from being broken.

Although the driving pulley 20 is constructed to change the effective diameter in the above embodiment, the driven pulley 30 instead of the driving pulley 20 may be constructed to change the effective diameter thereof. Moreover, a spur gear having an inner helical spline, a driving or driven shaft having an outer helical spline engaging with the helical spline of the spur gear, and weights having spur gear portions engaging with the spur gear may be used instead of the helical gear 220 with inner splines 221, shaft 1 with outer splines 5, and weights 250 with helical gear portions 254.

Figure 7:
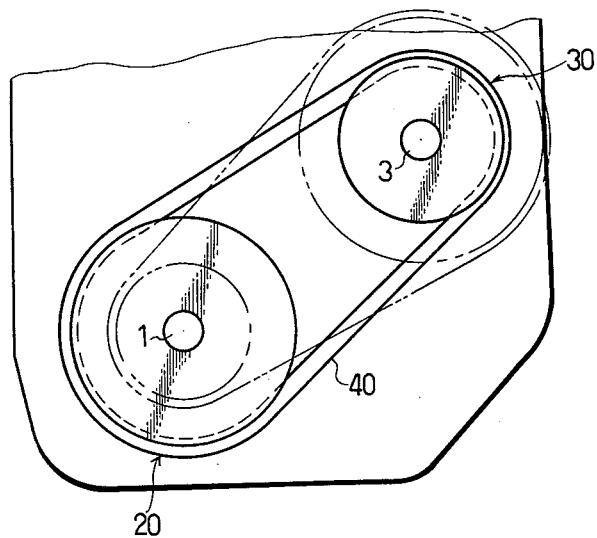
FIG. 7 is a diagramatic view of the second embodiment of the invention.

FIG. 7 shows diagramatically the second embodiment of the invention, in which the driven pulley 30 as well as the driving pulley 20 are of the type with a changeable effective diameter. In particular, the driven pulley 30 in this embodiment has such a conventional construction that the effective diameter becomes larger in accordance with the increase of the engine speed although not shown in detail. The driving pulley 20 of this embodiment is similar to that of the first embodiment.

According to the second embodiment, the speed ratio of the driven pulley 30 to the driving pulley 20 is widely and freely changeable, so that the optimum driving speed characteristic of the auxiliary machinery can be obtained adequately.

What we claim is:

1. A driving apparatus comprising:
   a driving shaft to be connected with a driving power source;
   a driving belt pulley connected to said driving shaft;
   a driven shaft to be connected to a driven unit;
   a driven belt pulley connected to said driven shaft; and
   a V belt on said driving and driven belt pulleys to link them together, wherein at least one of said belt pulleys comprises:
   a pulley disk secured to said driving or driven shaft for rotating integrally with said shaft;
   a generally cylindrical first pulley plate secured to the periphery of said pulley disk at one end thereof, said first pulley plate having a first slope portion at the other end thereof;
   an outer straight spline formed on said driving or driven shaft;
   a slidable helical gear having an inner straight spline engaging with said outer straight spline, said helical gear rotating integrally with said shaft but slidable relative to said shaft along said splines;
   a generally dish-like second pulley plate fixed to said helical gear for rotating and sliding integrally with said helical gear,
   a second slope portion formed on the periphery of said second pulley plate and facing on said first slope portion of said first pulley plate for forming with said first slope portion a V shaped annular groove in which said V belt is disposed, the width of said annular groove being changed by the slide of said second pulley plate;
   an end plate fixed to said shaft;
   at least one return spring interposed between said end plate and said second pulley plate for biasing said second pulley plate and hence said helical gear; and
   at least one weight having a foot portion rotatably supported on said driving disk, said foot portion having at the periphery thereof a helical gear portion engaging with said helical gear, said weight rotating with said shaft and being revolved relative to said disk by the centrifugal force acting thereon thereby to shift said helical gear against the force of said return spring, whereby the width of said annular groove and hence the effective diameter of at least one of said pulleys is changed in response to the rotational speed of said driving power source to change the speed ratio of said driven shaft to said driving shaft.

2. A driving apparatus as claimed in claim 1 wherein said at least one of pulleys further comprises:
   a first cylindrical portion formed on said second pulley plate;
   a second cylindrical portion formed on the periphery of said end plate and engaging with said first cylindrical portion for guiding said second pulley plate; and
   a stopper plate fixed to said end plate and facing to said second pulley plate for restricting the shift of said second pulley.

3. A driving apparatus as claimed in claim 1, wherein said second slope portion of said second pulley plate is shifted apart from said first slope portion of said first pulley plate in association with the revolution of said weight, whereby the effective diameter of said pulley is reduced dependently upon the increase of the rotational speed of said driving power source.

4. A driving apparatus comprising:
   a driving shaft to be connected with a driving power source;
   a driven shaft to be connected with a driven unit;
   a driving belt pulley connected to said driving shaft for rotating with said driving shaft;
   a driven belt pulley connected to said driven shaft for rotating with said driven shaft; and
   a belt on said driving and driven belt pulleys to link them together for rotating said driven pulley by said driving pulley therethrough, wherein at least one of said pulleys comprises:
   a first and a second rotating means connected to said driving or driven shaft for rotating with the same, said first and second rotating means being movable relative to each other and forming an annular groove with a changeable effective diameter changing in accordance with the relative movement of said first and second rotating means, said belt being in said annular groove with said effective diameter;
   a first gear means connected to one of said first and second rotating means;
   a second gear means supported on the other of said first and second rotating means and engaging with said first gear means, said second gear means being revolved in response to the rotational speed of said rotating means to cause said relative movement of said first and second rotating means, and
   means contacting with said belt for providing a suitable tension to said belt,
   wherein said driving or driven shaft includes a straight spline formed thereon;
   said first gear means includes a helical gear having a straight spline on the inner surface thereof, said straight spline of said helical gear engaging with said straight spline of said shaft; and
   said second gear means includes at least one weight rotatably supported on said one of said rotating means, said weight has a helical gear portion engaging with said helical gear.

* * * * *